(12) United States Patent
Iancu et al.

(10) Patent No.: US 11,375,008 B2
(45) Date of Patent: *Jun. 28, 2022

(54) CONSUMPTION OF DATA SERVICES PROVISIONED IN CLOUD INFRASTRUCTURES

(71) Applicant: YugaByte Inc, Sunnyvale, CA (US)

(72) Inventors: Mihnea-Marian Iancu, Sunnyvale, CA (US); Bogdan-Alexandru Matican, Sunnyvale, CA (US); Timur Tagirovich Yusupov, Sunnyvale, CA (US); Karthik Ranganathan, Sunnyvale, CA (US); Mikhail Andreyevich Bautin, Sunnyvale, CA (US); Ramkumar Vaidyanathan Sri, Sunnyvale, CA (US)

(73) Assignee: YugaByte Inc, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/443,825

(22) Filed: Jul. 28, 2021

(65) Prior Publication Data
US 2021/0360060 A1    Nov. 18, 2021

Related U.S. Application Data

(63) Continuation of application No. 16/398,283, filed on Apr. 30, 2019, now Pat. No. 11,108,853.
(Continued)

(51) Int. Cl.
*H04L 67/1042* (2022.01)
*H04L 67/00* (2022.01)
(Continued)

(52) U.S. Cl.
CPC ........ *H04L 67/1051* (2013.01); *G06F 9/5077* (2013.01); *G06F 16/27* (2019.01);
(Continued)

(58) Field of Classification Search
CPC ............. H04L 67/1051; H04L 41/0806; H04L 41/0893; H04L 41/22; H04L 61/1511;
(Continued)

(56) References Cited

U.S. PATENT DOCUMENTS 8,644,188 B1 * 2/2014 Brandwine ............. H04L 45/00
                                                                  370/254
2005/0132030 A1   6/2005 Hopen et al.
(Continued)

*Primary Examiner* — Hermon Asres
(74) *Attorney, Agent, or Firm* — Iphorizons PLLC; Narendra Reddy Thappeta

(57) ABSTRACT

An aspect of the present disclosure facilitates consumption of data services provisioned in cloud infrastructures. In one embodiment, a name server maintains a node-map data reflecting the corresponding set of nodes (in cloud infrastructures) currently hosting each of multiple data services. A consumer system (e.g. an end user system or another node in the cloud infrastructure) seeking to access a desired data service, sends to the name server a resolution request containing an identifier of the desired data service. The consumer system receives from the name server, identifiers of a set of nodes currently hosting the desired data service and then accesses the desired data service through at least one of the set of nodes.

31 Claims, 15 Drawing Sheets

Related U.S. Application Data

(60) Provisional application No. 62/690,344, filed on Jun. 26, 2018, provisional application No. 62/665,496, filed on May 1, 2018.

(51) Int. Cl.
*H04L 67/1097* (2022.01)
*H04L 41/0806* (2022.01)
*H04L 41/22* (2022.01)
*H04L 67/10* (2022.01)
*G06F 16/27* (2019.01)
*H04L 61/4511* (2022.01)
*H04L 67/60* (2022.01)
*H04L 41/0893* (2022.01)
*G06F 9/50* (2006.01)
*H04L 41/50* (2022.01)
*H04L 67/104* (2022.01)

(52) U.S. Cl.
CPC ...... *H04L 41/0806* (2013.01); *H04L 41/0893* (2013.01); *H04L 41/22* (2013.01); *H04L 61/1511* (2013.01); *H04L 67/10* (2013.01); *H04L 67/1097* (2013.01); *H04L 67/32* (2013.01); *H04L 67/34* (2013.01); *H04L 41/5096* (2013.01)

(58) Field of Classification Search
CPC ..... H04L 67/10; H04L 67/1097; H04L 67/32; H04L 67/34; H04L 41/5096; G06F 16/27; G06F 9/5077
USPC ........................................................ 709/219
See application file for complete search history.

(56) References Cited

U.S. PATENT DOCUMENTS

| | | |
|---|---|---|
| 2010/0042720 A1 | 2/2010 | Stienhans et al. |
| 2013/0024559 A1* | 1/2013 | Susanta ................. G06F 9/5061 709/224 |
| 2013/0346540 A1 | 12/2013 | Dean et al. |
| 2014/0280848 A1 | 9/2014 | Modh et al. |
| 2016/0105489 A1* | 4/2016 | Llorca ..................... H04L 67/04 709/226 |
| 2017/0006119 A1 | 1/2017 | Pogrebinsky et al. |
| 2018/0123904 A1 | 5/2018 | Thakrar et al. |
| 2018/0183656 A1 | 6/2018 | Jones |
| 2019/0036765 A1 | 1/2019 | Ghosal et al. |
| 2019/0098104 A1* | 3/2019 | Kim ......................... H04L 67/12 |
| 2019/0235946 A1 | 8/2019 | Guo et al. |
| 2019/0238634 A1 | 8/2019 | Mohanta et al. |
| 2020/0026625 A1 | 1/2020 | Konka et al. |

\* cited by examiner

Create Universe    1. Primary Cluster    2. Read Replica

430

Cloud Configuration    440

| Name | xdc-read-replicas |
| --- | --- |
| Provider | X GCP-config |
| Regions | X GCP-Oregon |
| Nodes | 3    Replication Factor   1   3   5   7 |

Availability Zones

| Name | Nodes | Preferred |
| --- | --- | --- |
| gcp-us-west1-a | 1 | ☒ |
| gcp-us-west1-b | 1 | ☒ |
| aws-us-west1-c | 1 | ☒ |

Reset config

✓ Primary data placement is geo-redundant, universe can survive at least 1 availability zone failure

450

Instance Configuration

Instance Type: n-standard-1

Volume Info: 2 × 250    EBS Type: GP2

Use Spot Pricing: ⊗    Assign Public IP: ⊗   Whether or not to assign a public IP.

Spot pricing suitable for test environments only, because spot instance might go away any

455

Advanced

...

465

Cancel    Create    Configure Read Replica

| | Name | Type | Value |
|---|---|---|---|
| 521 → | universe.yugabyte.com | NS | ns-1536.awsdns-00.co.uk, ns-1536.awsdns-00.com, ns-1024.awsdns-00.org, ns-512.awsdns-00.net |
| 522 → | universe.yugabyte.com | SOA | ns-1536.awsdns-00.co.uk. awsdns-hostmaster.amazon |
| 523 → | xdc-read-replicas.universe.yugabyte.com | A | 10.150.0.36, 10.150.0.42, 10.150.0.37, 172.152.40.119, 172.152.107.99, 172.152.82.148 |
| 524 → | primary.xdc-read-replicas.universe.yugabyte.com | A | 10.150.0.36, 10.150.0.42, 10.150.0.37 |
| 525 → | primary-cluster.xdc-read-replicas.universe.yugabyte.com | CNAME | primary.xdc-read-replicas.universe.yugabyte.com |
| 526 → | read-replica.xdc-read-replicas.universe.yugabyte.com | A | 172.152.40.119, 172.152.107.99, 172.152.82.148 |
| 527 → | west-coast.xdc-read-replicas.universe.yugabyte.com | A | 10.150.0.36, 10.150.0.42, 172.152.107.99 |
| 528 → | east-coast.xdc-read-replicas.universe.yugabyte.com | A | 172.152.82.148, 10.150.0.37 |

*FIG. 5A*

| Name | Type | Value |
|---|---|---|
| universe.yugabyte.com | NS | ns-1536.awsdns-00.co.uk, ns-1536.awsdns-00.com, ns-1024.awsdns-00.org, ns-512.awsdns-00.net |
| universe.yugabyte.com | SOA | ns-1536.awsdns-00.co.uk. awsdns-hostmaster.amazon |
| xdc-read-replicas.universe.yugabyte.com | A | 10.150.0.36, 172.152.40.119, 10.150.0.102, | 10.150.0.42, 172.152.107.99, 10.150.0.121, | 10.150.0.37, 172.152.82.148 10.150.0.79 |
| primary.xdc-read-replicas.universe.yugabyte.com | A | 10.150.0.36, 10.150.0.102, | 10.150.0.42, 10.150.0.121, | 10.150.0.37 10.150.0.79 |
| primary-cluster.xdc-read-replicas.universe.yugabyte.com | CNAME | primary.xdc-read-replicas.universe.yugabyte.com |
| read-replica.xdc-read-replicas.universe.yugabyte.com | A | 172.152.40.119, 172.152.107.99, 172.152.82.148 |
| west-coast.xdc-read-replicas.universe.yugabyte.com | A | 10.150.0.36, 172.152.107.99, | 10.150.0.42, 10.150.0.79 | 172.152.40.119, |
| east-coast.xdc-read-replicas.universe.yugabyte.com | A | 172.152.82.148, 10.150.0.121 | 10.150.0.37, | 10.150.0.102, |

560 →
```
String primaryClusterIdentifier = "primary-cluster.xdc-read-replicas.universe.yugabyte.com";
Cluster primaryCluster = Cluster.builder().addContactPoint(primaryClusterIdentifier).build();
Session session1 = primaryCluster.connect();
session1.execute("INSERT INTO users(id, name) values (1, 'John Doe')");
```

570 →
```
String readReplicaIdentifier = "read-replica.xdc-read-replicas.universe.yugabyte.com";
Cluster readReplicaCluster = Cluster.builder().addContactPoint(readReplicaIdentifier).build();
Session session2 = readReplicaCluster.connect();
session2.execute("SELECT * FROM users");
```

580 →
```
String eastCoastIdentifier = "east-coast.xdc-read-replicas.universe.yugabyte.com";
Cluster eastCoastCluster = Cluster.builder().addContactPoint(eastCoastIdentifier).build();
Session session3 = eastCoastCluster.connect();
session3.execute("SELECT * FROM users WHERE name = 'John Doe'");
```

Primary Cluster

| NAME | CLOUD | REGION | ZONE | MASTER | TSERVER | PRIVATE IP | STATUS | ACTION |
|---|---|---|---|---|---|---|---|---|
| Yb-15-xdc-read-replicas-n5 | gcp | us-west1 | us-west1-a | Details | Details | 10.150.0.36 | Live | ACTIONS ▾ |
| Yb-15-xdc-read-replicas-n4 | gcp | us-west1 | us-west1-c | Details (Leader) | Details | 10.150.0.42 | Live | ACTIONS ▾ |
| Yb-15-xdc-read-replicas-n6 | gcp | us-west1 | us-west1-b | Details | Details | 10.150.0.37 | Live | ACTIONS ▾ |

Read Replicas  640

| NAME | CLOUD | REGION | ZONE | MASTER | TSERVER | PRIVATE IP | STATUS | ACTION |
|---|---|---|---|---|---|---|---|---|
| Yb-15-xdc-read-replicas-n2 | aws | us-east-1 | us-east-1b | - | Details | 172.152.40.119 | Live | ACTIONS ▾ |
| Yb-15-xdc-read-replicas-n3 | aws | us-east-1 | us-east-1f | - | Details | 172.152.107.99 | Live | ACTIONS ▾ |
| Yb-15-xdc-read-replicas-n1 | aws | us-east-1 | us-east-1e | - | Details | 172.152.82.148 | Live | ACTIONS ▾ |

*FIG. 6C*

CONSUMPTION OF DATA SERVICES PROVISIONED IN CLOUD INFRASTRUCTURES

PRIORITY CLAIM

The present application is a continuation application of, and claims priority from, co-pending U.S. patent application entitled, "CONSUMPTION OF DATA SERVICES PROVISIONED IN CLOUD INFRASTRUCTURES", application Ser. No. 16/398,283, filed on Apr. 30, 2019, which in turn claims priority from U.S. Provisional Patent Application No. 62/665,496, filed May 1, 2018, entitled "ORCHESTRATION OF DISTRIBUTED DATABASES SPANNING DIVERSE CLOUD INFRASTRUCTURES," and U.S. Provisional Patent Application No. 62/690,344, filed Jun. 26, 2018, entitled "ORCHESTRATION OF DISTRIBUTED DATABASES SPANNING DIVERSE CLOUD INFRASTRUCTURES," both of which are incorporated herein by reference in their entireties.

RELATED APPLICATIONS

The present application is related to the following co-pending applications, which are both incorporated in their entirety into the present application:

1. Entitled, "ORCHESTRATION OF DATA SERVICES IN MULTIPLE CLOUD INFRASTRUCTURES", Ser. No. 16/398,279, Filed on Apr. 30, 2019, attorney docket number: YUGA-001-US, naming as inventors Bharat Chandra Baddepudi, et al.

2. Entitled, "SELECTION OF LEADER NODES IN DISTRIBUTED DATA SERVICES", Ser. No. 16/398,281, Filed on Apr. 30, 2019, now issued as U.S. Pat. No. 10,749,951, attorney docket number: YUGA-002-US, naming as inventors Bogdan-Alexandru Matican, et al.

BACKGROUND OF THE DISCLOSURE

Technical Field

The present disclosure relates to cloud computing and more specifically to consumption of data services provisioned in cloud infrastructures.

Related Art

Data services refer to implementations designed to provide access (storage and retrieval) to basic data using data storages. The basic data can be used by higher level applications such as electronic mail, enterprise applications, etc., as is well known in the relevant arts. Common examples of such data services are databases and file systems. Data services are referred to as 'data as a service' (DaaS) in several environments.

Data services are often provided based on cloud infrastructures. Cloud infrastructure refers to a collection of processing nodes, connectivity infrastructure, data storages, etc., which are engineered to together provide a virtual computing infrastructure for various customers, with the scale of such computing infrastructure being specified often on demand. Many vendors such as Amazon, Google, Microsoft, etc., provide corresponding public cloud infrastructures that span multiple continents currently.

Consumption of data services refers to usage of the data services by higher level applications to access desired data maintained in the data storages. Specifically, applications access desired data elements by interacting with data services according to pre-specified conventions. In the context of cloud infrastructures, the higher level applications may be executing in the nodes (such as application servers) of cloud infrastructure or may be applications executing in systems (such as end-user systems) external to the cloud infrastructure.

Aspects of the present disclosure relate to consumption of data services provisioned in cloud infrastructures.

BRIEF DESCRIPTION OF THE DRAWINGS

Example embodiments of the present disclosure will be described with reference to the accompanying drawings briefly described below.

FIGS. 4A-4C depicts sample user interfaces provided for provisioning/creation of a distributed database (example data service) in one embodiment.

FIGS. 5A and 5B depicts sample node-map data maintained for distributed databases (example data services) provisioned in cloud infrastructures in one embodiment.

FIG. 5C depicts portions of an application consuming a distributed database (example data service) provisioned in cloud infrastructures in one embodiment.

FIGS. 6A-6C depicts sample user interfaces provided for viewing the details of a provisioned distributed database (example data service) in one embodiment.

In the drawings, similar reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
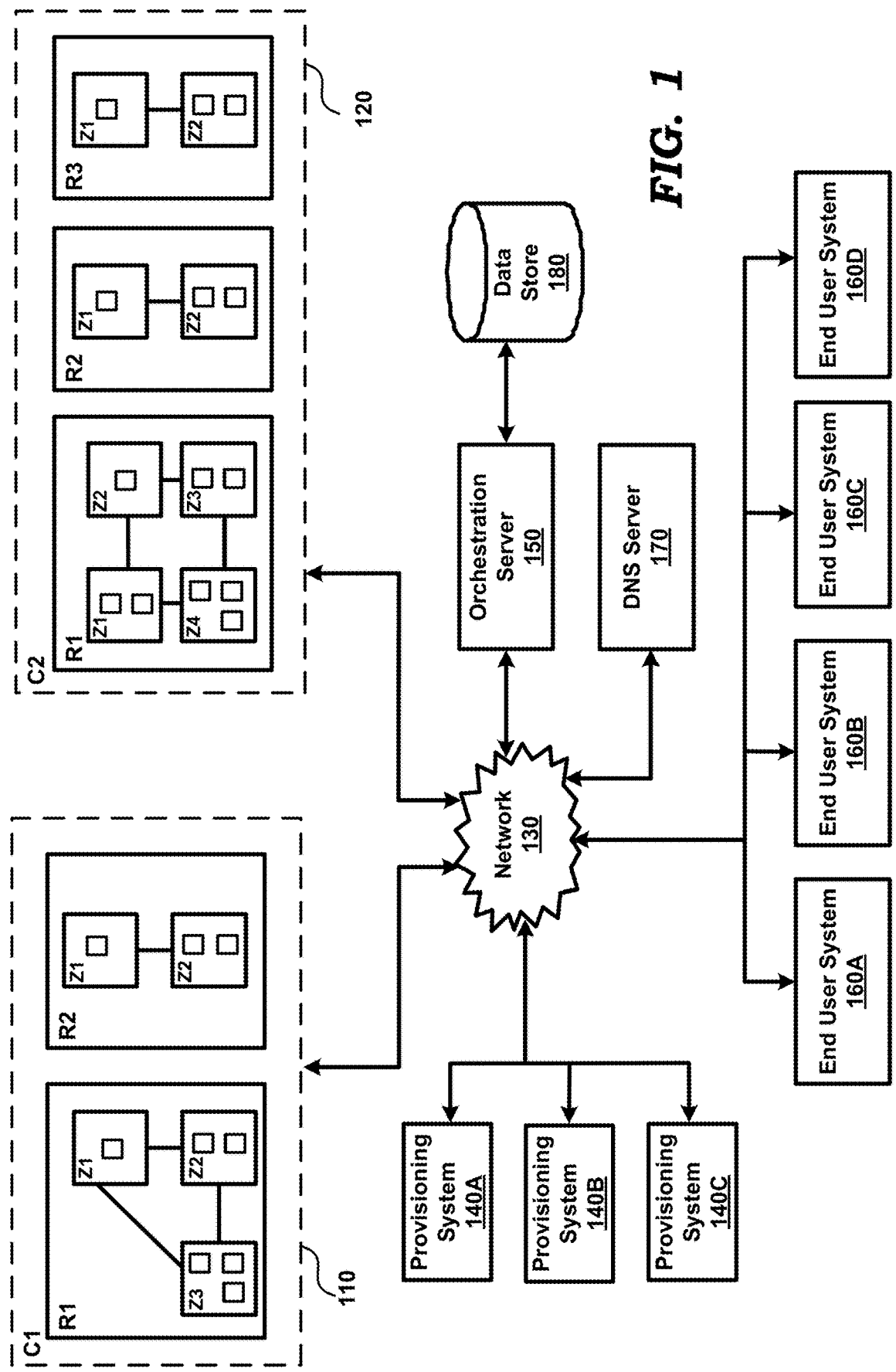
FIG. 1 is a block diagram illustrating an example environment (computing system) in which several aspects of the present disclosure can be implemented.

An aspect of the present disclosure facilitates consumption of data services provisioned in cloud infrastructures. In one embodiment, a name server maintains a node-map data reflecting the corresponding set of nodes (in cloud infrastructures) currently hosting each of multiple data services. A consumer system (e.g., an end user system or another node in the cloud infrastructure) seeking to access a desired data service, sends to the name server a resolution request containing an identifier of the desired data service. The consumer system receives from the name server, identifiers of a set of nodes currently hosting the desired data service and then accesses the desired data service through at least one node of the set of nodes.

According to another aspect of the present disclosure, the corresponding set of nodes currently hosting a data service spans first and second cloud infrastructures, and the set of nodes (sent in response to a resolution request) includes a first node from the first cloud infrastructure and a second node from the second cloud infrastructure. Accordingly, a consumer system is facilitated to consume data services provisioned in multiple cloud infrastructures.

According to one more aspect of the present disclosure, the corresponding set of nodes currently hosting a data service includes multiple nodes. Upon the resolution request including a qualifier along with the identifier of the data service, a name server sends only the nodes of the multiple nodes matching the qualifier as a response to the resolution request. Accordingly, a consumer system is facilitated to request for nodes of the data service that match desired qualifiers.

According to yet another aspect of the present disclosure, the multiple nodes hosting a data service are organized into multiple groups, each group being identified by a corresponding group identifier. A consumer system specifies a desired group identifier as the qualifier (along with the identifier of the data service) in a resolution request and receives nodes of a group identified by the desired group identifier as the set of nodes hosting the data service.

According to an aspect of the present disclosure, the groups of nodes hosting a data service includes a primary cluster containing a primary set of nodes for the data service, and a read-replica cluster containing a secondary set of nodes for the data service. A resolution request accordingly includes a qualifier that specifies one of the primary cluster and the read replica cluster (along with the identifier of the data service).

In one embodiment, a consumer system specifies the primary cluster as a qualifier in a resolution request, receives identifiers of the primary set of nodes as the set of nodes hosting the data service, and then performs a write operation on one of the primary set of nodes. In another embodiment, the consumer system specifies the read replica cluster as the qualifier, receives identifiers of the secondary set of nodes as the set of nodes hosting the data service, and then performs a read operation on one of the secondary set of nodes.

According to another aspect of the present disclosure, the groups of nodes hosting a data service represent corresponding regions. A consumer system specifies the identifier of a region in which the consumer system is present as the qualifier (along with the identifier of the data service) in a resolution request and receives nodes of the region as the set of nodes hosting the data service. Accordingly, the consumer system is facilitated to access the data service with low latency (in view of the consumer system and the accessed node being in the same region).

According to one more aspect of the present disclosure, the groups of nodes hosting a data service are formed according to availability zones and/or cloud infrastructures. As such, a consumer system is facilitated to retrieve the identifiers of the nodes in each availability zone and/or cloud infrastructure hosting a desired data service.

According to an aspect of the present disclosure, an orchestration server receives commands for performing orchestration tasks, with each orchestration task designed to change the corresponding set of nodes hosting corresponding data services. The name server maintains the changed set of nodes hosting each data service after performance of the corresponding orchestration task such that a consumer system is provided identifiers of the changed set of nodes currently hosting each data service.

In one embodiment, the corresponding set of nodes hosting a data service forms a universe for that data service, with the orchestration tasks including expanding the universe, shrinking the universe, and migration of the universe. The expanding of the universe causes addition of at least one node to the corresponding set of nodes, the shrinking of the universe causes removal of at least one node from the corresponding set of nodes, and the migration of the universe causes replacement of at least one node of the corresponding set of nodes with another node.

According to another aspect of the present disclosure, the orchestration server also operates as the name server (described above), with each data service being a distributed database.

According to one more aspect of the present disclosure, each node (in cloud infrastructures) is identified by a corresponding IP (Internet Protocol) address in the node-map data maintained by a name server. The node-map data is propagated is propagated to an external DNS (Domain Name System) server such that consumer systems can thereafter access the IP addresses of nodes providing each data service by interfacing with the external DNS server.

In one embodiment, the node-map data is also maintained according to DNS in the name server.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present disclosure can be implemented. The block diagram is shown containing cloud infrastructures 110 and 120, network 130, provisioning systems 140A-140C, orchestration server 150, end user systems 160A-160D, DNS (Domain Name System) server 170 and data store 180. The provisioning systems and end user systems are collectively referred to by 140 and 160 respectively.

Merely for illustration, only representative number/type of blocks is shown in the FIG. 1. Many environments often contain many more blocks, both in number and type, depending on the purpose for which the environment is designed. Each block of FIG. 1 is described below in further detail.

Each of cloud infrastructures 110 and 120 is collection of processing nodes, connectivity infrastructure, data storages, etc., which are engineered to together provide a virtual computing infrastructure for various customers, with the scale of such computing infrastructure being specified often on demand. The nodes can be virtual nodes (e.g., virtual machines (VMs), containers containing one or more VMs) operating based on physical nodes, physical nodes themselves, or a combination as well.

It may be appreciated that the cloud infrastructures typically span several continents and are provided by different vendors. In addition, each cloud infrastructure may vary substantially from another in terms of interface requirements, scale, technical characters of nodes, hardware/software/network implementation, etc., and thus the cloud infrastructures are said to be diverse. Examples of such diverse cloud infrastructures include, but are not limited to, public clouds such as Amazon Web Services (AWS) Cloud available from Amazon.com, Inc., Google Cloud Platform (GCP) available from Google LLC, etc., and private clouds such as On-Premises clouds owned by the customers.

Cloud infrastructure (C1) 110 is shown containing nodes (processing or storage, shown as squares) located in two different geographical regions R1 and R2. Each region is shown containing multiple availability zones (named as Z1, Z2, etc.), each having independent support infrastructure such as power, networking, etc. Each availability zone (e.g., C1-R1-Z1) can thus operate independent of other zones, such that the availability zone can continue to operate even upon the failure of the other zones (e.g., C1-R1-Z2 and C1-R1-Z3). Cloud infrastructure (C2) 120 is similarly shown with regions R1, R3, R4 with respective regional sets of availability zones, with each availability zone containing respective nodes.

Network 130 represents a network providing connectivity between cloud infrastructures 110 and 120, provisioning systems 140, orchestration server 150, end user systems 160 and DNS server 170. Network 110 may be an internetwork (including the world-wide connected Internet), an intranet, a combination of internetwork and intranet, etc. Network 110 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by network 130. When the packet contains content such as port numbers, which specifies a target application, the packet may be said to be directed to such application as well.

Each of the provisioning systems 140A-140C is designed to control configuration of nodes within a corresponding cloud infrastructure. Thus, provisioning systems 140A and 140B may respectively be for controlling cloud infrastructures 110 and 120, and be provided by vendors of the respective cloud infrastructures. Provisioning system 140C represents a similar system, but provided by third party vendors (who do not provide the cloud infrastructure themselves). Thus provisioning system 140C may communicate directly with the corresponding cloud infrastructure (say 120) or interface with the vendor provided provisioning system (140B) to cause the corresponding configuration. Communication directly implies that the corresponding instruction is encoded in IP packets directed to (the nodes of) the cloud infrastructure. Examples of third party provisioning systems include, but are not limited to, Ansible available from Red Hat Inc, TerraForm available from HashiCorp, Inc, etc.

DNS server 170 represents a server system that translates (typically user-friendly) domain names into IP addresses needed for locating and accessing computer services and devices (in general network entities) with the underlying network protocols. As is well known, the Domain Name System is a hierarchical and decentralized naming system for network entities connected to network 130, with each entity having an associated network location (IP address) and also a user-friendly domain name.

Data store 180 represents a non-volatile (persistent) storage facilitating storage and retrieval of data (details of nodes, etc.) by applications executing in orchestration server 150. Data store 180 may be implemented as a corresponding database server using relational database technologies and accordingly provide storage and retrieval of data using structured queries such as SQL (Structured Query Language). Alternatively, data store 180 may be implemented as a corresponding file server providing storage and retrieval of data in the form of files organized as one or more directories, as is well known in the relevant arts.

Each of end user systems 160A-160D represents a system such as a personal computer, workstation, mobile device, computing tablet etc., used by users/customers to generate (user) requests directed to applications executing in orchestration server 150. The user requests may be generated using appropriate user interfaces (e.g., web pages provided by an application executing in the server, a native user interface provided by a portion of an application downloaded from the server, etc.). In general, end user system requests an application for performing desired tasks and receives the corresponding responses (e.g., web pages) containing the results of performance of the requested tasks. The web pages/responses may then be presented to the user/customer at end user systems 160 by client applications such as the browser.

Orchestration server 150 represents a server system, such as a web/application server, executing applications designed to perform tasks requested by users/customers using end user systems 160. Specifically, orchestration server 150 facilitates users/customers to perform orchestration of data services in cloud infrastructures (such as 110 and 120). Orchestration of a data service typically entails creation or formation of a collection of processing nodes and data storage nodes (hereafter referred to as "universe") for hosting the data service, any preparatory steps thereto (checking node availability, etc.), configuration of the nodes in the universe to provide the data service, and/or subsequent administrative tasks (hereafter referred to as "orchestration tasks"). Examples of such orchestration tasks include expanding/shrinking the universe, replacing nodes of the universe on demand (i.e., migrating application/data to another node), increasing replication factor, taking backups, restoring from a backup, upgrading/downgrading the data service implementation, etc.

After provisioning, a data service may be used/consumed (to access desired data maintained in the data storages) by higher level applications executing in other nodes (such as application servers) of cloud infrastructures 110/120 or executing in end user systems 160 external to cloud infrastructures 110/120. In the following description, the term "consumer system" is used to refer to any system (such as nodes of cloud infrastructures 110/120 or end user systems 160) executing higher level applications designed to consume/access the basic data provided by data services provisioned in cloud infrastructures.

It may be readily appreciated that a consumer system desiring access to a target data service needs to be provided with the details (e.g. identifiers, IP addresses) of the universe (set of nodes) hosting the target data service. Once the universe is provided, the consumer system may connect to a desired node of the universe to perform desired data operations (e.g. write operation, read operation) with the basic data provided by the target data service.

Orchestration server 150, extended according to several features of the present disclosure, facilitates the consumption of data services provisioned in cloud infrastructures as described below with examples.

3. Consumption of Data Services Provisioned in Cloud Infrastructures

Figure 2:
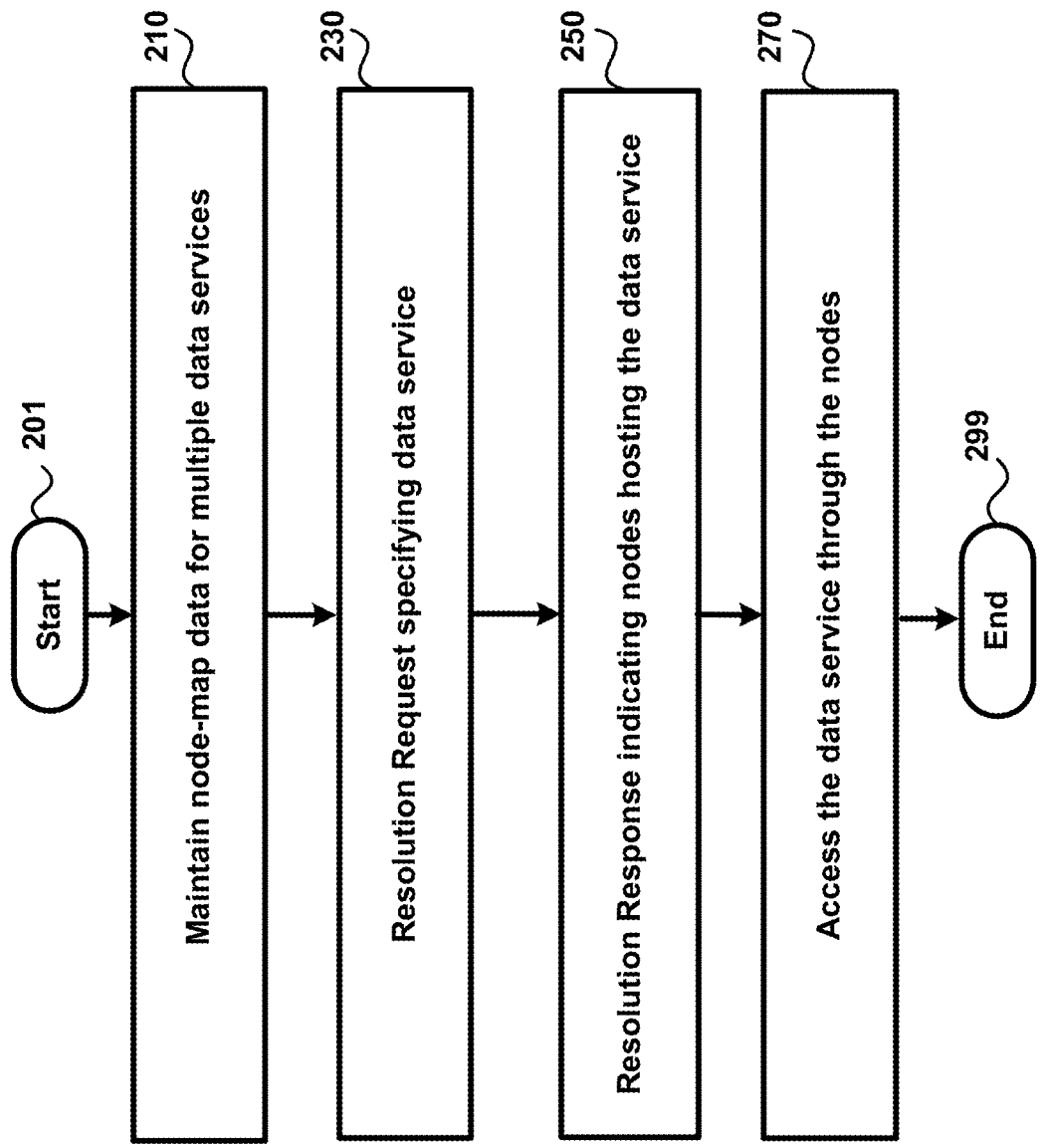
FIG. 2 is a flowchart illustrating the manner in which consumption of data services provisioned in cloud infrastructures is facilitated according to an aspect of the present disclosure.

FIG. 2 is a flowchart illustrating the manner in which consumption of data services provisioned in cloud infrastructures is facilitated according to an aspect of the present disclosure. The flowchart is described with respect to the systems of FIG. 1, in particular, orchestration server 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many such implementations are contemplated to be covered by several aspects of the present invention. The flow chart begins in step 201, in which control immediately passes to step 210.

In step 210, orchestration server 150 maintains a node-map data reflecting the corresponding nodes currently provisioned for multiple data services. In one embodiment, the node-map data is in the form of a mapping between user understandable identifiers of data services to corresponding sets of IP addresses of the collection of nodes (universe) provisioned for the data services in cloud infrastructures 110 and 120.

The node-map data may be maintained as a database/table maintained in data store 180 (implemented as a database server using relational database technologies). Alternatively, the node-map data source may be maintained in one or more files in data store 180 (when implemented as a file server).

According to an aspect, the node-map data also reflects the characteristics associated with the nodes of the universe hosting each data service. For example, when the universe of a data service is organized into multiple groups (with each group being identified by a corresponding group identifier), the node-map data also reflects the groups associated with each node within the universe. The groups may be formed according to one of operation type (primary cluster vs read-replica cluster), regions (C1-R1, C1-R2, etc.), availability zones (C2-R2-Z1, C2-R2-Z2, etc.), and cloud infrastructures (C1, C2, etc.).

In step 230, orchestration server 150 receives from a consumer system a resolution request containing an identifier of a data service (sought to be accessed). Orchestration server 150 then identifies based on the node-map data, a set of nodes forming a universe hosting the specified data service. In the embodiment noted above, orchestration server 150 may inspect the mapping/node-map data to identify the set of IP addresses corresponding to the identifier of the data service received in the request.

In the scenario that the resolution request includes a qualifier, orchestration server 150 identifies only the nodes of the universe matching the qualifier. For example, when the qualifier is a group identifier, only the nodes identified by/associated with the specified group identifier are identified by orchestration server 150.

In step 250, orchestration server 150 sends a resolution response (to the requesting consumer system) indicating the nodes hosting the data service specified in the resolution request. If the resolution request included a qualifier, the identifiers of only the nodes hosting the data service and matching the qualifier are indicated in the resolution response.

In step 270, the consumer system accesses the data service through at least one of the nodes indicated in the resolution response. As noted above, accessing may entail sending access requests directed to one or more nodes of the universe using the data (e.g. IP addresses) provided in the resolution response and receiving corresponding responses from the nodes. The access requests may specify desired data operations (e.g. write operation, read operation) to be performed with the basic data provided by the data service. The flowchart ends in step 299.

Thus, orchestration server 150 operates as a name server that translates user friendly identifiers to IP addresses needed for locating and accessing data services with the underlying network protocols. A consumer system is accordingly relieved of the burden of tracking the details (e.g. IP addresses) of the nodes forming the universe hosting a specific data service. Such an architecture providing a level of indirection allows for changes to provisioned nodes for each data service without forcing changes to the higher level applications/consumer systems that send the access requests.

According to an aspect of the present disclosure, orchestration server 150 propagates the node-map data to an external DNS (Domain Name System) server such that consumer systems can thereafter access the IP addresses of nodes providing each data service.

The manner in which orchestration server 150 facilitates the consumption of data services provisioned in cloud infrastructures according to the operation of FIG. 2 is illustrated below with examples.

4. Example Data Service

In the following sections, several aspects of the present disclosure are illustrated with respect to a distributed database as an example of a data service. However the features of the present disclosure may be implemented with respect to other data services (e.g., file server, replicated databases) as well, as will be apparent to one skilled in the relevant arts by reading the disclosure herein.

A distributed database is often implemented based on multiple nodes that cooperatively provide a unified view of database interfaces, while shielding the users from the underlying storage and processing of data. Distributed databases thus provide for fault tolerance (of nodes or storage), enhanced performance, data redundancy (by a replication factor), etc., as is well known in the relevant arts.

Figure 3A:
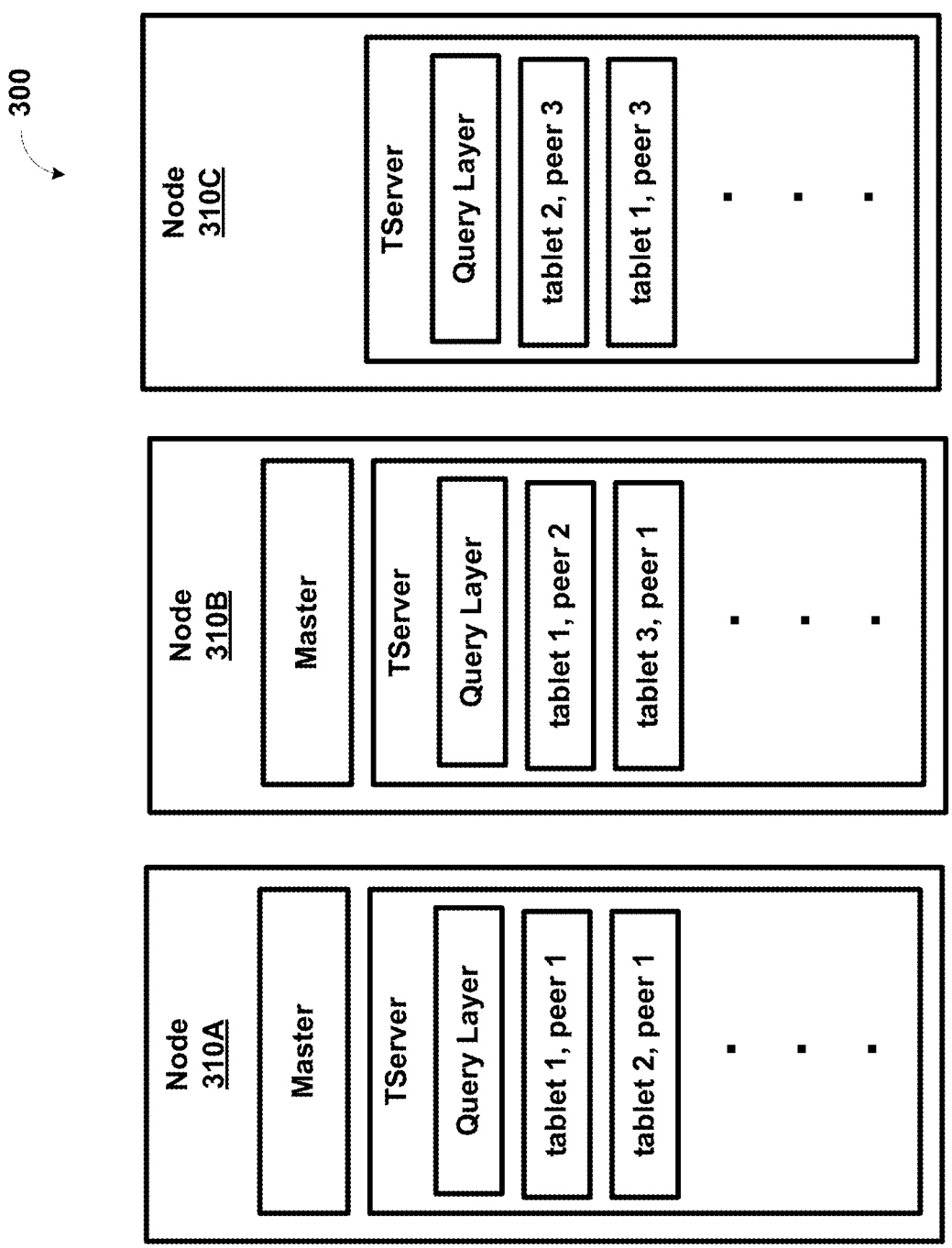
FIG. 3A depicts the internal details of a distributed database (example data service) in one embodiment.

FIG. 3A depicts the internal details of a distributed database (example data service) in one embodiment. Distributed database 300 is a group of nodes such as VMs, physical machines or containers (referred to as a "universe") that collectively function as a highly available and resilient distributed database. For illustration, the universe of distributed database 300 is shown containing three nodes 310A-310C, though in alternative embodiments, distributed databases contain fewer or more nodes depending on the purpose for which the database is designed.

Distributed database 300 is a system-of-record/authoritative database that geo-distributed applications can rely on for correctness and availability. Distributed database 300 allows applications to easily scale up and scale down across multiple regions in the public cloud, on-premises data centers or across hybrid environments without creating operational complexity or increasing the risk of outages.

Distributed database 300 may be deployed in a variety of configurations depending on business requirements, and latency considerations. Some examples are single availability zone (zone/rack/failure domain), multiple availability zones in a region, multiple regions (with synchronous and asynchronous replication choices), etc. An example of such a distributed database is YugaByte DB available from YugaByte, Inc. The components of distributed database 300 are described in detail below.

In one embodiment, the universe of distributed database 300 consists of one or more keyspaces, with each keyspace being a namespace that can contain one or more database tables. Distributed database 300 automatically shards, replicates and load-balances these database tables across the nodes in the universe, while respecting user-intent such as cross-AZ or region placement requirements, desired replication factor, and so on. Distributed database 300 automatically handles failures (e.g., node, availability zone or region failures), and re-distributes and re-replicates data back to desired levels across the remaining available nodes while still respecting any data placement requirements.

Distributed database 300 has two components—Master process and TServer process. The Master (Server) processes are responsible for keeping system metadata/records, such as what tables exist in the system, where their tablets live, what users/roles exist, the permissions associated with them, etc. Master processes also are responsible for coordinating system-wide operations such as create/alter drop tables and initiating maintenance operations such as load-balancing or initiating re-replication of under-replicated data. The Master process' executing in the different nodes (310A-310B) are not in the critical path of IO against user tables (which is handled by TServer processes as described below).

The TServer processes are responsible for hosting/serving user data (e.g., database tables). Each TServer process does the actual IO for end user requests received from user applications. The user requests may be according to the various protocols supported by distributed database 300. Query Layer, executing as part of each TServer process, implements the server-side of multiple protocols/APIs that distributed database 300 supports such as Apache Cassandra CQL, Redis APIs, SQL API, etc.

In one embodiment, each database table is split/sharded into one or more tablets based on groups of primary keys. Each tablet is composed of one or more tablet-peers depending on the replication factor, with each TServer process hosting one or more tablet-peers. The manner in which a table having one or more tablets with a replication factor of 3 (that is, 3 peers) may be maintained in nodes 310A-310C is depicted in FIG. 3.

Each TServer process also coordinates operations across tablets hosted by it by using techniques such as server-global block cache (leading to highly efficient memory utilization in cases when one tablet is read more often than others), throttled compactions (to prevent high foreground latencies during a compaction storm), small/large compaction queues to keep the system functional even in extreme IO patterns, server-global memstore limits, auto-sizing of block cache/memstore, striping tablet load uniformly across data disks, etc.

In one embodiment, the Master and TServer processes use Raft, a distributed consensus algorithm, for replicating changes to system metadata or user data respectively across a set of nodes. The detail of the Raft consensus algorithm is available in the paper entitled "In Search of an Understandable Consensus Algorithm (Extended Version)" by Diego Ongaro and John Ousterhout of Stanford University. Specifically, the Master process' executing in the different nodes (310A-310B) forms a Raft group with its peers, while the tablet-peers (e.g. "tablet 1, peer 1", "tablet 1, peer 2", etc.) corresponding to each tablet (e.g. "tablet 1") hosted on different TServers (in nodes 310A-310C) form a corresponding Raft group and replicate data between each other.

Thus, the Master and TServer processes along with the operation of Raft groups provides for a transactional, high performance distributed database (300) for planet-scale applications. It may be appreciated that multiple distributed databases similar to database 300 may be hosted by cloud infrastructures 110 and 120. The manner in which multiple distributed databases may be hosted in multiple cloud infrastructures is described in detail below.

Figure 3B:
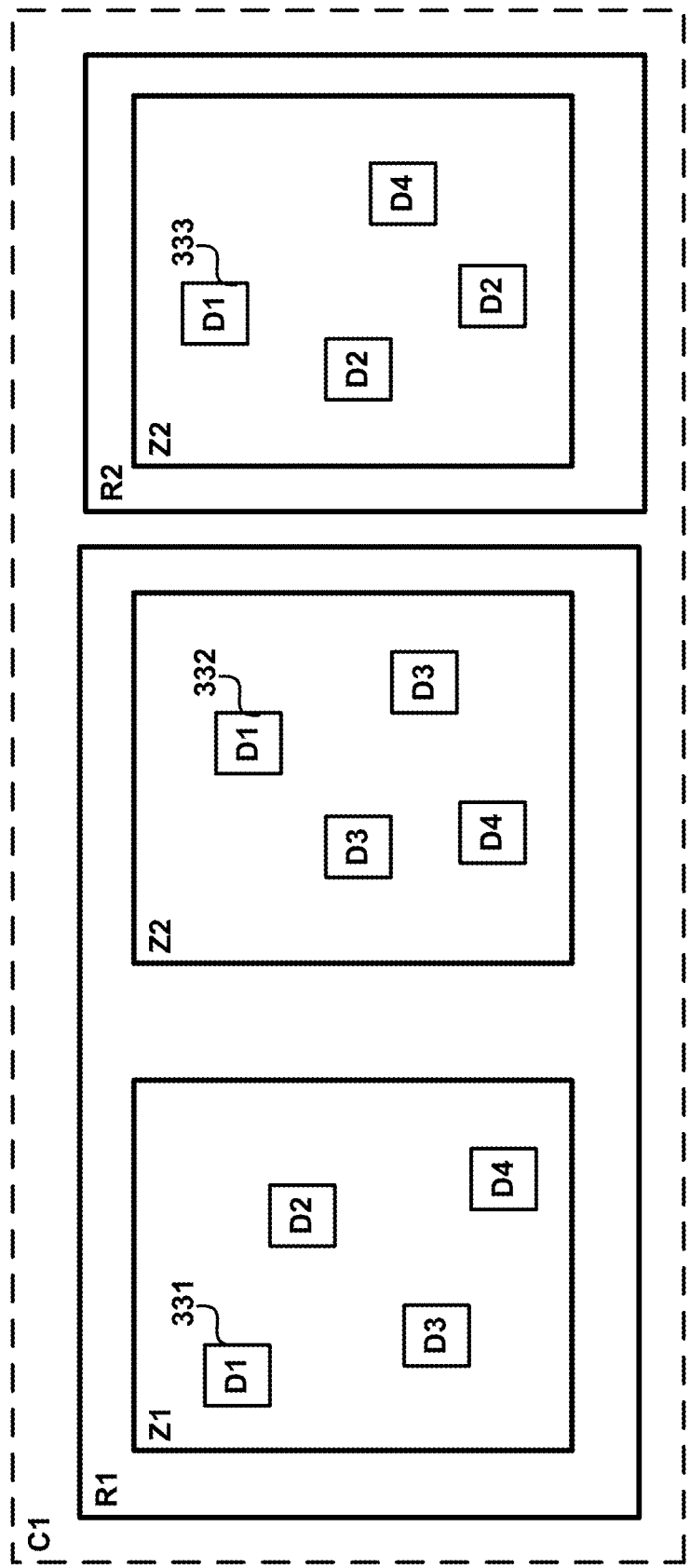
FIG. 3B depicts the manner in which distributed databases (example data services) are hosted in cloud infrastructures in one embodiment.

FIG. 3B depicts the manner in which distributed databases (example data services) are hosted in multiple cloud infrastructures in one embodiment. For illustration, only a sample set of universes (hosting distributed databases) in a single cloud infrastructure is shown in the Figure. However, the features of the present disclosure can be implemented for universes spanning multiple availability zones and/or regions and/or cloud infrastructures, as will be apparent to one skilled in the relevant arts by reading the disclosure herein.

Specifically, four data services labeled D1, D2, D3 and D4 are shown in FIG. 3B with the corresponding nodes (shown as squares) distributed among three availability zones Z1, Z2 and Z3 within geographical regions R1 and R2 in cloud infrastructure C1. In the following description, data service D1 is assumed to correspond to distributed database 300.

Data service D1 is shown hosted by the universe of nodes 331-333 distributed among multiple availability zones and geographical regions to provide features such as fault tolerance, enhanced performance, data redundancy, etc. The other data services (D2, D3, etc.) are similarly shown hosted on corresponding sets of nodes labeled with the identifier of the data service (D2, D3, etc.).

The manner in which orchestration server 150 facilitates the provisioning/creation of distributed database 300 is described below with examples.

5. Provisioning of a Distributed Database

Figure 4A:
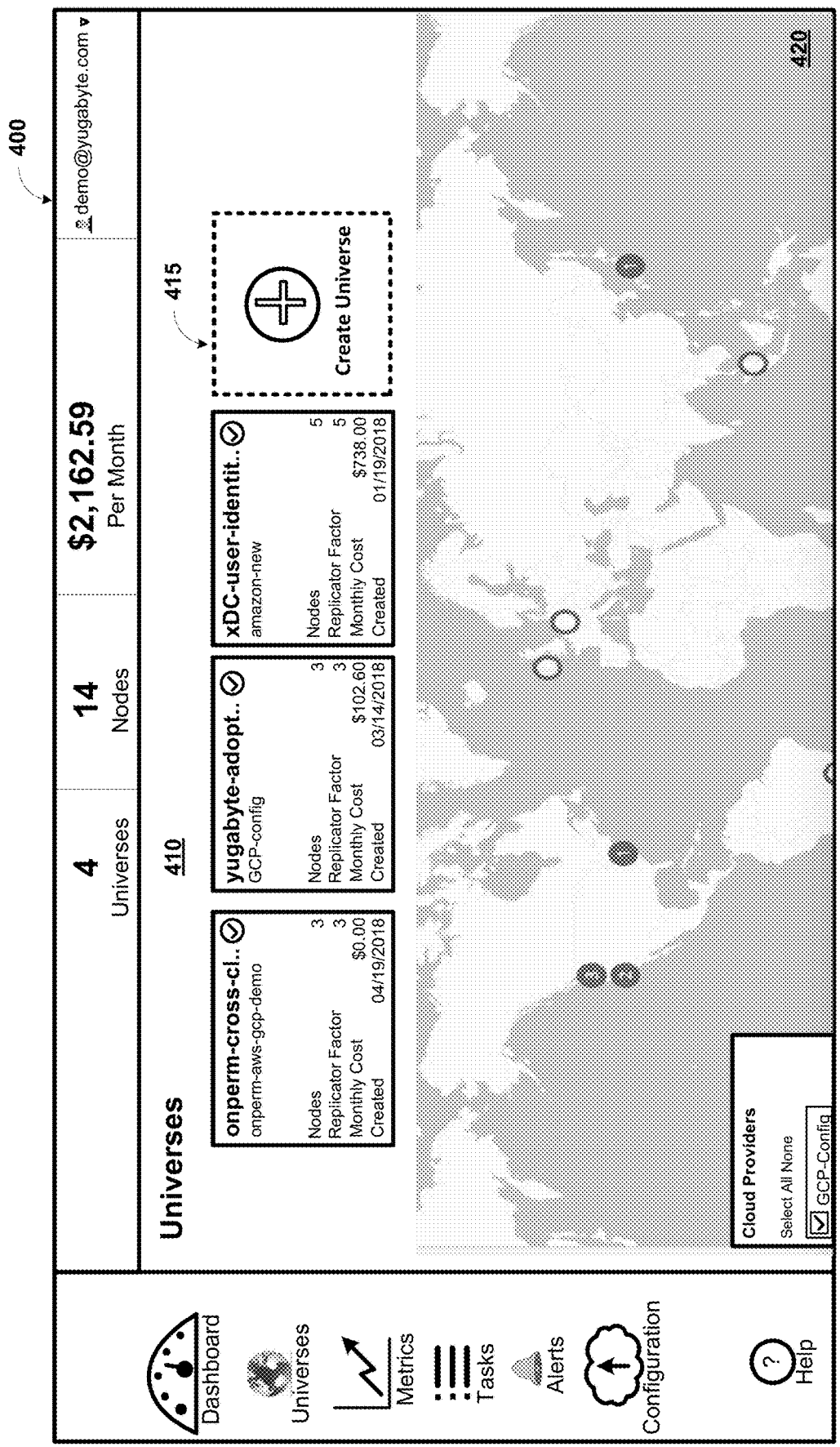
Figure 4C:
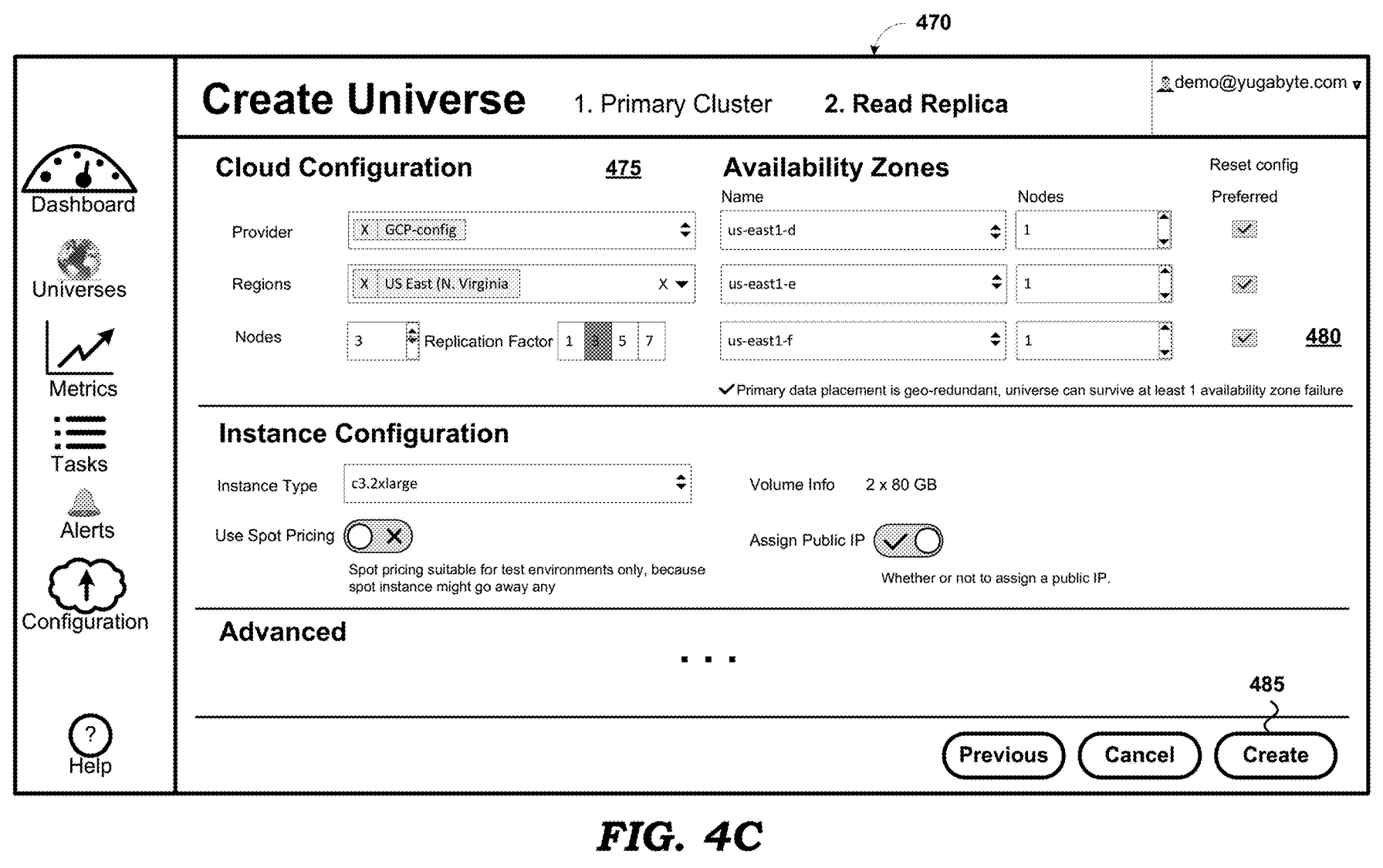

FIGS. 4A-4C depicts sample user interfaces provided for provisioning/creation of a distributed database (example data service) in one embodiment. Display areas 400 and 430 represent a respective portion of a user interface displayed on a display unit (not shown) associated with end user system 160. In one embodiment, display area 400/430/470 corresponds to a web page rendered by a browser executing on end user system 160. Web pages are provided by orchestration server 150 in response to a user sending appropriate requests (for example, by specifying corresponding URLs in the address bar) using the browser.

Referring to FIG. 4A, display area 400 depicts a "Dashboard" web page that is displayed in the browser (executing in end user system 160) in response to a user/customer specifying a URL in the browser address bar. Display area 410 depicts the various distributed database universes (clusters) that have been previously been provisioned by the customer. Display area 420 depicts the universes graphically on a world map, with each circle indicating a corresponding region and the number within the circle indicating the corresponding number of zones in which nodes have been provisioned for the customer. The user/customer may click/select display area 415 to indicate creation of a new universe (distributed database).

Referring to FIG. 4B, display area 330 depicts a "Create Universe" web page that is displayed in the browser in response to the user/customer clicking/selecting display area 415 in FIG. 4A. Display area 440 facilitates the user/customer to specify a name for the universe/cloud (e.g. "xdc-read-replicas"), the specific provider (e.g. "GCP-config"), the specific regions (e.g. "GCP-Oregon"), the number of nodes (e.g. 3) and the replication factor (e.g. 3).

It may be appreciated that the user/customer may select any desired number and/or combination of desired providers and/or regions and/or nodes in the interface of display area 440. For example, to create a universe in AWS, the user may specify the provider as "AWS-new" and the specific region(s) as "AWS-Oregon".

In response to the user/customer specifying the details in display area 440, orchestration server 150 determines the availability zones in the regions selected in display area 440 and the distribution of the customer specified nodes among the zones and displays the corresponding information in display area 450. In display area 450, the "Preferred" check box has been shown selected for all of the zones gcp-us-west1-a, gcp-us-west1-b, and gcp-us-west1-c indicating that all the three zones are preferred (in other words, there is no specific zone that is more preferred than the others) for the leader nodes.

The user/customer may then specify the desired node distribution (1 node in each zone) among the different zones shown in display area 450 and also the details of the instance to be provisioned (e.g. "n-standard-1") on the nodes in display area 455. The user/customer may also specify one or more advanced options (not shown for conciseness) in display area 460. After specifying the desired details, the user/customer may click/select "Create" button 490 to indicate the creation of the specified universe.

In one embodiment, the user/customer clicks/selects "Configure Read Replica" button 465 to configure the read replication details. The read replica is a cluster of nodes that maintains a read-only copy of the data in an asynchronous manner from the nodes in the primary cluster (shown in FIG. 3A). Such a read replica may be desirable when the latency of doing a distributed consensus based write among the nodes in the primary cluster is not tolerable for some workloads.

Referring to FIG. 4C, display area 470 depicts a "Create Universe (Read Replica)" web page that is displayed in the browser in response to the user/customer clicking/selecting button 465 in FIG. 4B. The display areas (e.g. 480 and 485) shown in FIG. 4C operate similar to the corresponding display areas (e.g. 440 and 450) of FIG. 4B, and accordingly their description is not repeated here for conciseness. It may be appreciated that the user/customer may select (in display area 480) a combination of providers and/or regions for the read replica different from that selected (in display area 440) for the primary cluster. After specifying the desired details, the user/customer may click/select "Create" button 490 to indicate the creation of the specified universe.

In response to the user/customer selecting button 490 in FIG. 4C, orchestration server 150 then performs one or more underlying tasks for creating the customer specified universe/distributed database such as provisioning the nodes, configuring the nodes, initiating the Master processes on the nodes, waiting for the master processes to be alive, initiating the TServer processes on the nodes, and waiting for the TServer processes to be alive.

Orchestration server 150 performs the tasks noted above by sending appropriate commands to provisioning systems 140A-140C to cause the creation/provisioning of the distributed database (300). Orchestration server 150 also maintains a node-map data specifying the details of distributed databases orchestrated in multiple cloud infrastructures as described below with examples.

6. Node-Map Data

FIGS. 5A and 5B depicts sample node-map data maintained for distributed databases (example data services) provisioned in cloud infrastructures in one embodiment. For illustration, the node-map data is assumed to be maintained in the form of tables in data store 180. However, in alternative embodiments, the node-map data may be maintained according to other data formats (such as files according to extensible markup language (XML), etc.) and/or using other data structures (such as lists, trees, etc.), as will be apparent to one skilled in the relevant arts by reading the disclosure herein.

In one embodiment, the node-map data is maintained consistent with DNS (Domain Name System) technology. In particular, A/CNAME records are maintained indicating the nodes in each universe. As is well known, an "A" record maps a name/identifier to an IP (Internet Protocol) address of the node, while a "CNAME" record maps a name/identifier to another name/identifier (which may be further translated to an IP address based on another DNS record by the same or another DNS server).

Referring to FIG. 5A, table 500 depicts a portion of node-map data containing one or more rows/records. Column 511 ("Name") specifies a unique name/identifier for each record, column 512 ("Type") specifies the type of the record such as "A", "CNAME", etc. and column 513 ("Value") specifies the values associated with the unique name/identifier.

Thus, rows 521-528 correspond to records maintained by orchestration server 150 for distributed databases (example data services) orchestrated in multiple cloud infrastructures. Specifically, rows 521 and 522 correspond to records that are required for propagation to an external DNS server, in this case, Route53 DNS provided by Amazon Web Services. Additional such records specific to other DNS servers may similarly be maintained as part of node-map data (table 500).

Row/record 523 specifies the IP addresses of the nodes belonging to the universe "xdc-read-replicas.universe.yugabyte.com" created using the user interfaces of FIGS. 4A-4C. It may be observed that the name "xdc-read-replicas.universe.yugabyte.com" is mapped to nodes in GCP (10.150.0.36, 10.150.0.42, 10.150.0.42). The specific IP addresses may be received by orchestration server 150 after performing the creation of the database universe specified in the user interfaces of FIGS. 4A-4C. In particular, orchestration server 150 issues commands and receives the IP address (along with other details) of the nodes provisioned by provisioning systems 140A-140C. Orchestration server 150 then inserts row/record 523 in table 500.

Rows/records 524-528 specify subsets/groups of nodes of the distributed database universe. Specifically, rows/records 524 and 526 specify subsets grouped by clusters (primary cluster, read-replica cluster, etc.) while rows/records 527 and 528 specify groups organized by geographical regions (west-coast, east-coast, etc.), which facilitates addressability of such groups of nodes. It may be observed that row/record 525 is of type CNAME and is accordingly mapped to another name/identifier.

It may be appreciated that orchestration server 150 also updates the rows/records in table 500 according to relevant changes (adding or removing nodes or any data configuration options such as placement information or instance definitions) in the underlying database universe as described below with examples.

7. Update of Node-Map Data

In one embodiment, orchestration server 150 updates the node-map table in response to performing orchestration tasks for expanding/shrinking the universe of the distributed database based on demand, zero downtime migrations of a deployment: from one hardware type to another; from one cloud provider to another, expand a deployment/universe to one or more additional cloud providers, etc.

Referring to FIG. 5B, table 500 depicts portions of node-map data updated after performance of an orchestration task. In particular, the node-map data is shown after performance of an expand universe task with 3 new nodes. Row 551 indicates that the record for "xdc-read-replicas.universe.yugabyte.com" has been updated with the IP addresses of the additional 3 nodes. In addition, row/record 552 indicates that the corresponding groups have also been updated with the IP addresses of the 3 new nodes. Rows 553 and 554 indicate that the new IP addresses have been added to the relevant geographical location groups.

Similarly, in response to shrink universe orchestration task received from the customer, table 500 may be updated to remove the IP addresses of the nodes removed from the universe. Also, in response to migration of the universe orchestration task, table 500 may be updated to replace one or more IP address of the nodes with different IP address (of the nodes to where the data service has been migrated).

Thus, orchestration server 150 maintains different types of DNS records in data storage locally within orchestration server 150 or in data store 180, independent of any configuration data maintained by the cloud infrastructures. As such, these DNS records can be shared with all consumer systems that require access to the underlying data and would thus require a one-time configuration to encode these DNS records (leaving it up to orchestration server 150 to account for underlying changes in the record set).

It should be noted that when resolution requests for a data service are received at time instances that the node-map data is as shown in FIG. 5A, row 523 indicates the current set of nodes hosting the distributed database (data service) and accordingly the IP addresses in row 523 are provided as a (resolution) response to such resolution requests. For subsequent resolution requests received after update of the node-map data shown in FIG. 5B, row 551 indicates the current set of nodes and accordingly IP address in row 551 are provided as a response to the subsequent resolution requests. Accordingly, accurate responses are generated even as changes are effected by execution of orchestration commands.

The manner in which the node-map data of FIGS. 5A/5B is used during the consumption of the distributed database is described below with examples.

8. Consuming a Distributed Database

FIG. 5C depicts portions of an application consuming a distributed database (example data service) provisioned in cloud infrastructures in one embodiment. The application may be executing in a consumer system (one of nodes of cloud infrastructures 110/120 or one of end user systems 160).

Data portion 560 depicts the manner in which an application (or a part thereof) connects to nodes of a primary cluster of a universe (here "primary-cluster.xdc-read-replicas.universe.yugabyte.com") and execute one or more write (INSERT) operations. Data portion 560 specifically causes a write operation to be sent to (and executed on) one of the nodes from the primary cluster.

Data portion 570 depicts the manner in which an application (or a part thereof) connects to nodes of a read-replica cluster of a universe (here "read-replica.xdc-read-replicas.universe.yugabyte.com") and execute one or more read (SELECT) operations. Data portion 570 specifically causes a read operation to be sent to (and executed on) one of the nodes from the read-replica cluster.

Data portion 580 depicts the manner in which an application (or a part thereof) connects to nodes in a specific region (in which the consumer system is located) of a universe (here "east-coast.xdc-read-replicas.universe.yugabyte.com") and execute one or more operations. Data portion 580 specifically causes a read operation to be sent to (and executed on) one of the nodes in the "east-coast" region. The read operation may be performed with low latency in view of the consumer system and the node executing the read operation being in the same region.

Thus, the node-map data maintained by orchestration server 150 facilitates the consumption of the distributed database (data service) provisioned in cloud infrastructures 110/120. According to an aspect of the present disclosure, orchestration server 150 propagates the node-map data of table 500 to an external DNS (Domain Name System) server such as Route53 DNS provided by Amazon Web Service noted above. The propagated records facilitate the consumer systems to access the corresponding information when sending operations to distributed database 300.

Such an architecture providing a level of indirection that allows for changes to provisioned nodes for each distributed database without forcing changes to the consumer systems/higher level applications is highly desirable in data services (such as distributed databases), where the elasticity, mobility and ease of reconfiguration provides the customers a great deal of potential flexibility, whether it is scaling their universes up or down, migrating to a new set of instances with more resources, shifting workloads across regions or zones, or spanning across multiple clouds.

In addition, since orchestration server 150 provides a seamless integration over various APIs of public clouds (AWS, GCP, Azure, etc), private deployments (on-premise) as well as containerized environments (Docker, Kubernetes), the addressability mechanism operates as a native, unified point of entry for the user/customer, abstracting away from the individual APIs.

Furthermore, orchestration server 150 may provide consumer systems with various aliases (names/identifiers) for more granular addressability options. These would cover both slicing individual universes (by geo-location, cloud, region, zone, etc.) as described above, as well as allowing for separation of various deployment environments, such as production, QA, development, etc. (since each distributed database deployment and each customer, would be namespaced separately). All of these aliases would be managed by orchestration server 150 and have the same elasticity guarantees.

Thus, orchestration server 150 facilitates the provisioning of a distributed database (possibly spanning diverse cloud infrastructure) and also operates as a name server facilitating consumer systems to consume the distributed database (data service). The user/customer may view the details of the universe as described below with examples.

9. Viewing Details of a Provisioned Distributed Database

Figure 6A:
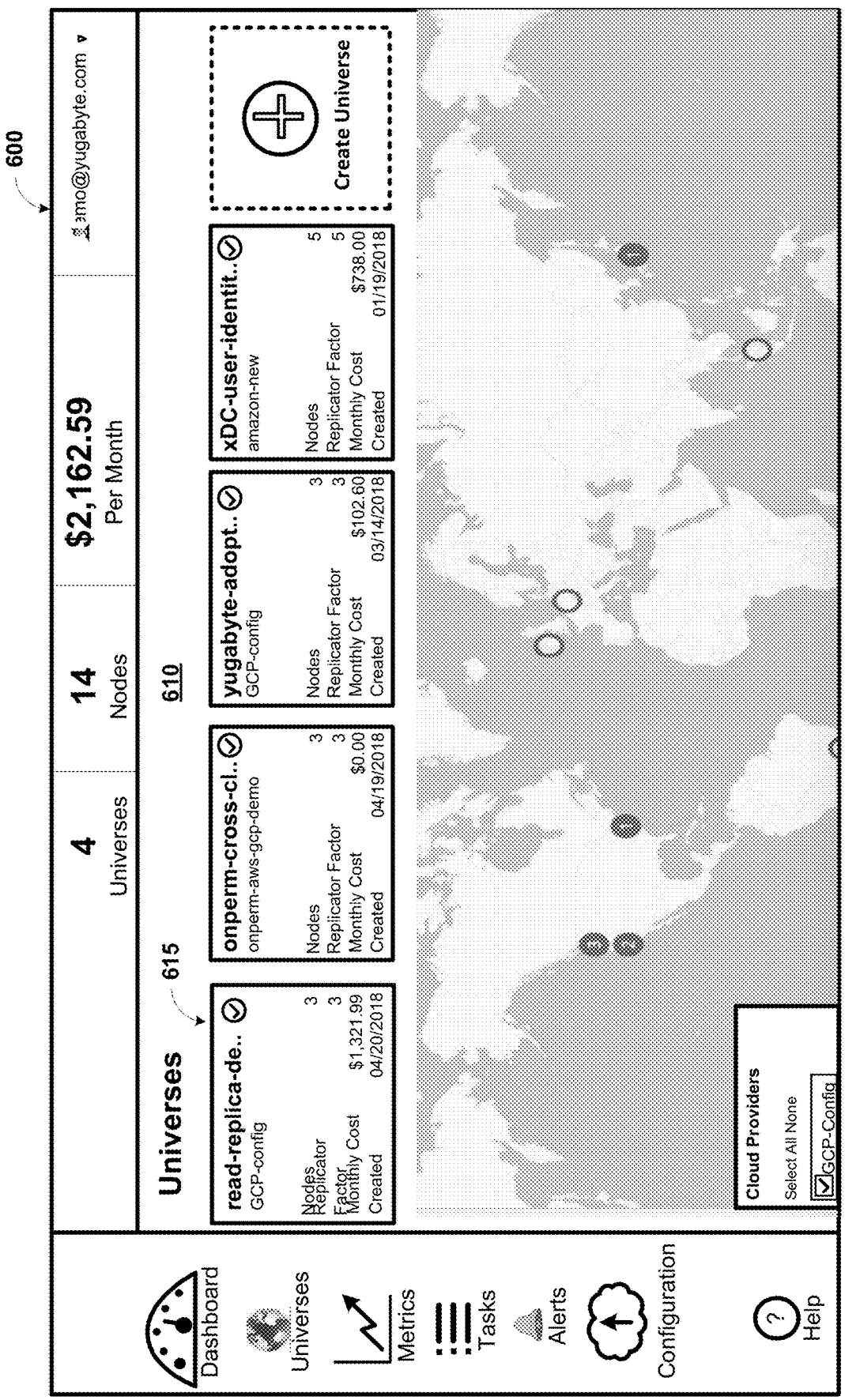
Figure 6B:
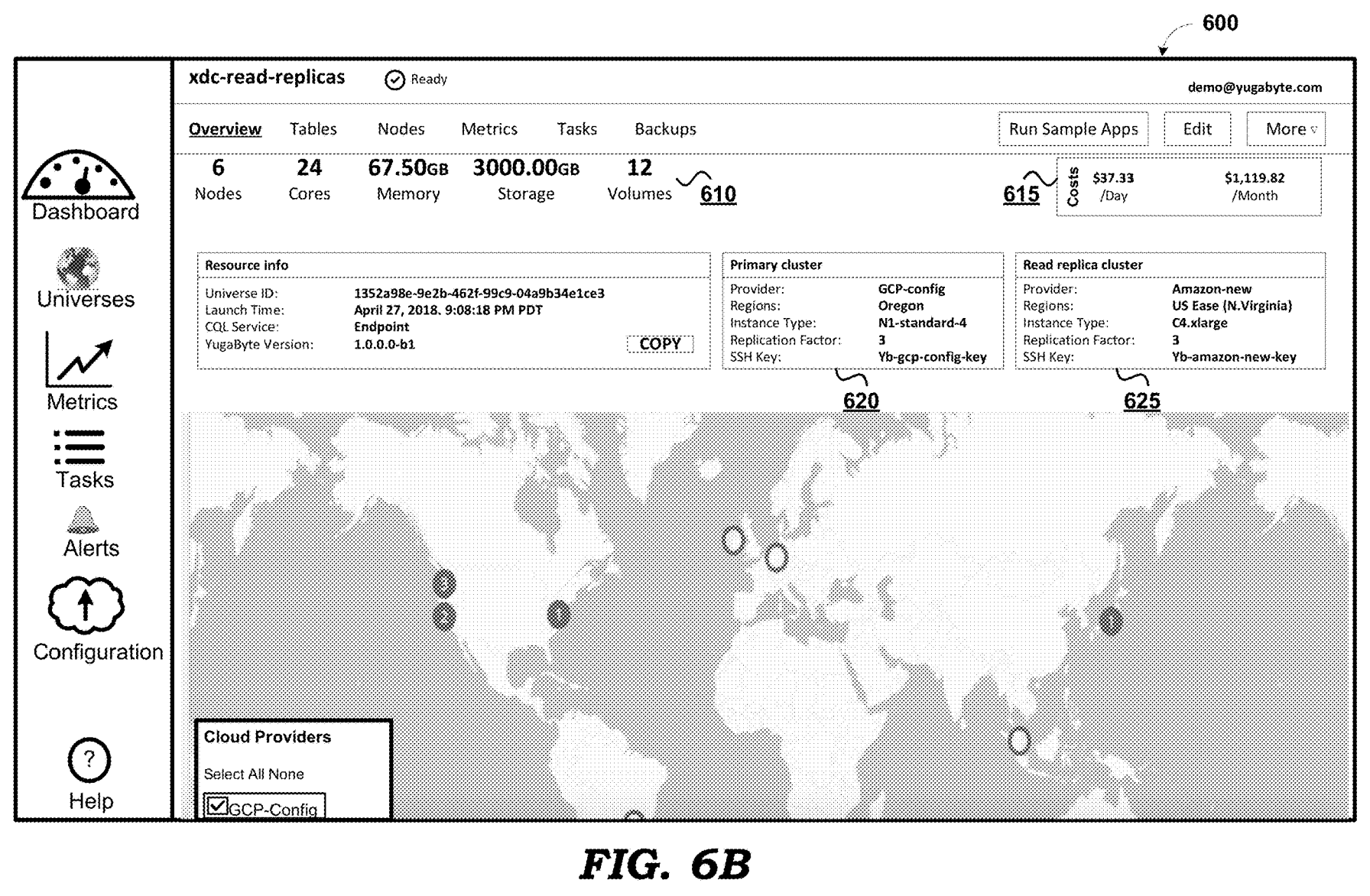

FIGS. 6A-6C depicts sample user interfaces provided for viewing the details of a provisioned distributed database (example data service) in one embodiment. Display area 600 represents a portion of a user interface displayed on a display unit (not shown) associated with end user system 160. In one embodiment, display area 600 corresponds to a web page rendered by a browser executing on end user system 160. Web pages are provided by orchestration server 150 in response to a user sending appropriate requests (for example, by specifying corresponding URLs in the address bar) using the browser.

Display area 600 of FIG. 6A, similar to display area 400 of FIG. 4A, displays a "Dashboard" page but with the newly created universe "xdc-read-replicas" (created using the interfaces of FIGS. 4A-4C) shown in display area 610. The user/customer may then click/select display area 615 to view the details of the newly created universe.

Display area 600 of FIG. 6B accordingly depicts an "Overview" web page that is displayed in the browser (executing in end user system 160) in response to a user/customer selecting the universe named "xdc-read-replicas" by clicking/selecting display area 615 of FIG. 6A. Display area 610 depicts the details of the provisioned nodes such as the number of nodes, the number of CPUs, the total storage, etc., while display area 615 depicts the details of the cost of the provisioned nodes. Display area 620 depicts the details of the primary cluster such as the specific cloud provider (GCP), the region and the zone to which the nodes belong, while display area 625 depict the corresponding details of the read replica cluster.

Display area 600 of FIG. 6C depicts the "Nodes" web page that is displayed in the browser in response to a user/customer selecting the tab "Nodes" in FIG. 6B. Display area 640 specifies the details of the nodes that are provisioned as part of the universe. In particular, display area 640 depicts respective tables of nodes allocated to the primary cluster and the read replica during provisioning/creation of distributed database 300. It may be readily observed that the nodes shown in display area 640 correspond to the nodes shown in rows 524 and 526 of FIG. 5A.

Thus, a user/customer is facilitated to view the details of a previously provisioned distributed database. The manner in which orchestration server 150 is implemented in one embodiment is described below with examples.

10. Orchestration Server

According to an aspect of the present disclosure, orchestration server 150 provides an infrastructure independent control plane for orchestration of distributed data services such as distributed databases in multiple cloud infrastructures. In one embodiment, an admin console application (described below) executing in orchestration server 150 provides the control plane for installing, managing and orchestrating several aspects of the distributed databases. An example of such an admin console application is the YugaWare application available from YugaByte, Inc.

Figure 7:
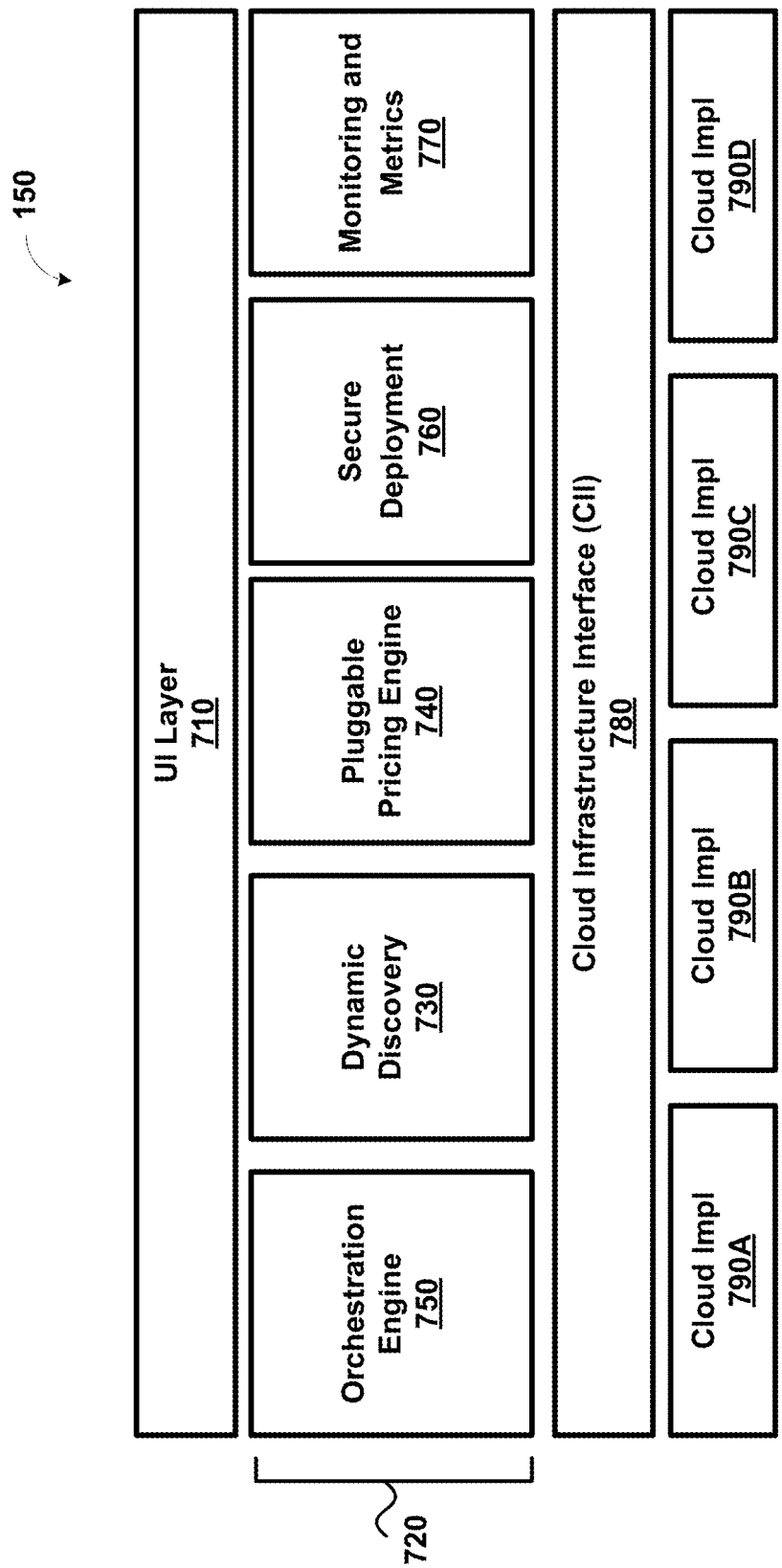
FIG. 7 is a block diagram illustrating an example implementation of an infrastructure independent control plane (admin console application) provided in an orchestration server in one embodiment.

FIG. 7 is a block diagram illustrating an example implementation of an infrastructure independent control plane (admin console application) provided in an orchestration server in one embodiment. The block diagram is shown containing user interface (UI) layer 710, application programming interface (API) layer 720, cloud infrastructure interface (CII) 780 and cloud implementations 790A-290D. API layer 720 in turn is shown containing orchestration engine 750, dynamic discovery 730, pluggable pricing engine 740, secure deployment 760, monitoring and metrics 770.

Merely for illustration, only representative number/type of blocks is shown in the FIG. 7. In addition, the blocks are shown executing in orchestration server 150. Many environments often contain many more blocks, both in number and type, with some of the blocks executing in other systems/servers, depending on the purpose for which the environment is designed. Each block of FIG. 7 is described below in further detail.

UI layer 710 receives user requests from (users/customers using) end user system 160 and sends appropriate web pages as corresponding responses to the user requests. UI layer 710 also receives inputs provided by the users in the provided web pages and invokes the corresponding modules in API layer 720. In one embodiment, UI layer 710 is implemented using React JS.

API layer 720 contains one or more modules implementing corresponding functionalities provided by the control plane. For example, orchestration engine 750 facilitates the orchestration of a distributed database spanning diverse cloud infrastructures. Dynamic discovery 730, provided according to several aspects of the present disclosure, facilitates discovery of new nodes based on configuration such that the provisioning of an application/service can be modified without affecting other applications/services. Pluggable pricing engine 740 facilitates users/customers to view the approximate costs of provisioning of a distributed database including what-if scenarios.

Secure deployment 760 facilitates the secured provisioning/deployment of the distributed databases including features such as network isolation, encryption, access control, etc. Monitoring and metrics 770 facilitates users/customers to monitor various metrics such as CPU usage, memory usage, requests processed, etc. associated with the virtual/physical nodes on which a distributed database has been provisioned. In one embodiment, the modules of API layer 720 are implemented in Java™ programming language.

In one embodiment, the admin console application makes orchestration tasks intent based, and greatly simplifies operational complexity. These intents can be specified via UI layer 710. In other words, the user/customer using UI layer 710 specifies the intent of the orchestration, with the modules in API layer 720 then performing various underlying tasks associated with the intent without requiring the user/customer to either specify or be aware of the underlying tasks.

Examples of such intents covering the entire life-cycle of a distributed database include, but are not limited to, creation of a distributed database (described above), expanding/shrinking the distributed database based on demand, deploy data across fault domains (multi-zone, multi-region, multi-cloud configurations), zero downtime database software upgrade, zero downtime migrations of a deployment: from one hardware type to another; from one cloud provide to another, stretching a deployment from one cloud to another cloud.

In an embodiment, the implementations of each of such intents are invocable by corresponding calls of an API, e.g., via a REST API. Such a feature can be the basis for implementing automation of various tasks associated with distributed databases. For example, an automated script can be implemented by appropriate calls to the API to expand the number of nodes in the database universe during expected peak usage durations and to shrink (reduce the number of nodes in) the database universe during non-peak usage durations.

CII 780 provides a cloud agnostic interface to the modules in API layer 720, such that the modules are facilitated to be implemented without having any cloud specific details. Each of cloud implementations 790A-790D represents a corresponding module that is specific to a cloud infrastructure such as AWS, GCP, On-Premises, etc. CII 780 in association with cloud implementations 790A-790D together operate to convert high-level tasks invoked from API layer 720 to the corresponding actual set of commands specific to the cloud infrastructure, as will apparent to one skilled in the relevant arts. The commands may be sent to one or more of provisioning systems 140A-140C, which in turn cause the commands to be executed in the corresponding cloud infrastructure (110 and 120). In one embodiment, CII 780 and cloud implementations 790A-790D (or portions thereof) are implemented in Python™ programming language.

Thus, orchestration server 150 implements an infrastructure independent control plane that facilitates several features of the present disclosure.

It should be appreciated that the features described above can be implemented in various embodiments as a desired combination of one or more of hardware, software, and firmware. The description is continued with respect to an embodiment in which various features are operative when the software instructions described above are executed.

11. Digital Processing System

Figure 8:
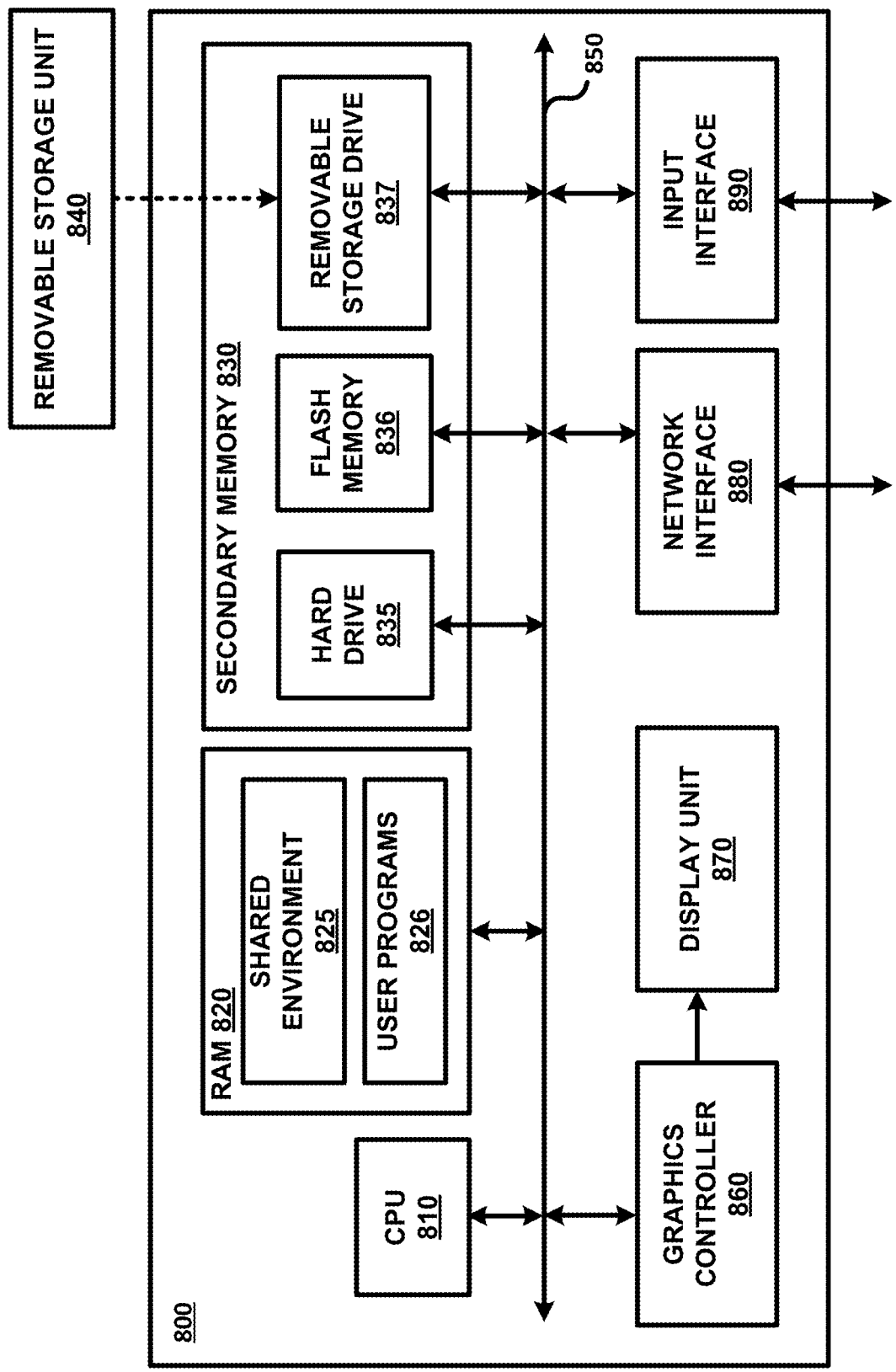
FIG. 8 is a block diagram illustrating the details of a digital processing system in which various aspects of the present disclosure are operative by execution of appropriate executable modules.

FIG. 8 is a block diagram illustrating the details of digital processing system 800 in which various aspects of the present disclosure are operative by execution of appropriate executable modules. Digital processing system 800 may correspond to any one of orchestration server 150, end user systems 160 and provisioning systems 140.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or other user programs 826 (such as other applications, DBMS, etc.). In addition to shared environment 825, RAM 820 may contain other software programs such as device drivers, virtual machines, etc., which provide a (common) run time environment for execution of other/user programs.

Graphics controller 860 generates display signals (e.g., in RGB format) to display unit 870 based on data/instructions received from CPU 810. Display unit 870 contains a display screen to display the images defined by the display signals (for example, the portions of the user interfaces shown in FIGS. 4A-4C and 6A-6C). Input interface 890 may correspond to a keyboard and a pointing device (e.g., touch-pad, mouse) and may be used to provide inputs (for example, the user inputs provided in the above noted user interfaces). Network interface 880 provides connectivity to a network (e.g., using Internet Protocol), and may be used to communicate with other systems (of FIG. 1) connected to the network (130).

Secondary memory 830 may contain hard drive 835, flash memory 836, and removable storage drive 837. Secondary memory 830 may store the data (for example, portions of data of FIGS. 5A and 5B, data/commands sent to provisioning systems 140) and software instructions (for example, for implementing the actions of FIG. 2, etc.), which enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

12. Conclusion

While various embodiments of the present disclosure have been described above, it should be understood that they have been presented by way of example only, and not limitation. Thus, the breadth and scope of the present disclosure should not be limited by any of the above-described exemplary embodiments.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A computing system comprising:
   a plurality of cloud infrastructures containing nodes hosting a plurality of data services, each data service being hosted on a corresponding set of nodes at a corresponding time duration, wherein the corresponding set of nodes hosting a data service forms a universe for that data service in that time duration,
   wherein the corresponding set of nodes change upon performance of orchestration tasks, said orchestration tasks comprise expanding the universe, shrinking the universe, and migration of the universe,
   wherein expanding of the universe causes addition of at least one node to the corresponding set of nodes,
   wherein shrinking of the universe causes removal of at least one node from the corresponding set of nodes,
   wherein migration of the universe causes replacement of at least one node of the corresponding set of nodes with another node; and
   a name server maintaining a node-map data reflecting the corresponding set of nodes currently hosting each of said plurality of data services, wherein said node map data indicates at a first time instance that a first data service of said plurality of data services is currently hosted on a first set of nodes;
   wherein a consumer system is operable to perform the actions of:
      sending, after said first time instance, to said name server a resolution request containing an identifier of said first data service sought to be accessed;
      receiving from said name server, identifiers of said first set of nodes currently hosting said first data service; and
      accessing said first data service through at least one of said first set of nodes using the corresponding identifier received from said name server.

2. The computing system of claim 1, wherein the corresponding set of nodes currently hosting said first data service spans a first cloud infrastructure and a second cloud infrastructure, wherein said first set of nodes includes a first node from said first cloud infrastructure and a second node from said second cloud infrastructure.

3. The computing system of claim 1, wherein the corresponding set of nodes currently hosting said first data service comprises a first plurality of nodes, wherein said resolution request includes a qualifier along with said identifier, wherein said first set of nodes includes only those of said first plurality of nodes matching said qualifier.

4. The computing system of claim 3, wherein said first plurality of nodes are organized into a plurality of groups, each group being identified by a corresponding group identifier,
   wherein said consumer system specifies a desired group identifier as said qualifier and receives nodes of a group identified by said desired group identifier as said first set of nodes.

5. The computing system of claim 4, wherein said plurality of groups includes a primary cluster comprising a primary set of nodes for said first data service, and a read-replica cluster comprising a secondary set of nodes for said first data service,
   wherein said qualifier specifies one of said primary cluster and said read replica cluster.

6. The computing system of claim 5, wherein said consumer system specifies said primary cluster as said qualifier and receives identifiers of said primary set of nodes as said first set of nodes,
   wherein said accessing comprises a write operation on one of said primary set of nodes.

7. The computing system of claim 5, wherein said consumer system specifies said read replica cluster as said qualifier and receives identifiers of said secondary set of nodes as said first set of nodes,
   wherein said accessing comprises a read operation on one of said secondary set of nodes.

8. The computing system of claim 4, wherein said plurality of groups represents a plurality of regions,
   wherein said consumer system specifies the identifier of a region in which said consumer system is present as said qualifier and receives nodes of said region as said first set of nodes, whereby said accessing of said first data service is facilitated to be performed with low latency.

9. The computing system of claim 4, wherein said plurality of groups is formed according to one of deployment environments, availability zones and cloud infrastructures.

10. The computing system of claim 1, further comprising an orchestration server which receives commands for performing orchestration tasks, with each orchestration task designed to change the corresponding set of nodes hosting corresponding data services,
    wherein said name server maintains the changed set of nodes hosting each data service after performance of the corresponding orchestration task such that said consumer system is provided identifiers of the changed set of nodes currently hosting said first data service.

11. The computing system of claim 10, wherein said wherein said orchestration server also operates as said name server, wherein each data service of said plurality of data services is a distributed database.

12. The computing system of claim 1, wherein each node is identified by a corresponding IP (Internet Protocol) address in said node-map data, said computing system further comprising an external DNS (Domain Name System) server to which said node-map data is propagated such that said consumer system can thereafter access the IP addresses of nodes providing each data service.

13. The computing system of claim 12, wherein said node-map data is also maintained according to DNS in said name server.

14. A non-transitory machine readable medium storing one or more sequences of instructions, wherein execution of said one or more sequences of instructions by one or more processors contained in a name server causes said name server to perform the actions of:
maintaining a node-map data reflecting a corresponding set of nodes currently hosting each of a plurality of data services in a cloud infrastructure,
wherein the corresponding set of nodes hosting a data service forms a universe for that data service in that time duration,
wherein the corresponding set of nodes change upon performance of orchestration tasks on the universe, said orchestration tasks comprise at least one of expanding the universe, shrinking the universe, and migration of the universe,
wherein expanding of the universe causes addition of at least one node to the corresponding set of nodes,
wherein shrinking of the universe causes removal of at least one node from the corresponding set of nodes,
wherein migration of the universe causes replacement of at least one node of the corresponding set of nodes with another node,
wherein said node map data indicates at a first time instance that a first data service of said plurality of data services is currently hosted on a first set of nodes;
receiving, from a consumer system after said first time instance, a resolution request containing an identifier of said first data service; and
sending, as a response to said resolution request, identifiers of said first set of nodes currently hosting said first data service as indicated by said node-map data.

15. The non-transitory machine readable medium of claim 14, wherein the corresponding sets of nodes are provided in a plurality of cloud infrastructures,
wherein said first set of nodes includes a first node from a first cloud infrastructure and a second node from a second cloud infrastructure.

16. The non-transitory machine readable medium of claim 14, wherein the corresponding set of nodes currently hosting said first data service comprises a first plurality of nodes, wherein said resolution request includes a qualifier along with said identifier, further comprising one or more instructions for:
including in said first set of nodes only those of said first plurality of nodes matching said qualifier.

17. The non-transitory machine readable medium of claim 16, wherein said first plurality of nodes are organized into a plurality of groups, each group being identified by a corresponding group identifier,
wherein said resolution request specifies a desired group identifier as said qualifier and said including includes nodes of a group identified by said desired group identifier in said first set of nodes.

18. The non-transitory machine readable medium of claim 17, wherein said plurality of groups are formed according to one of operation type, regions, availability zones, cloud infrastructures.

19. The non-transitory machine readable medium of claim 14, further comprising one or more instructions for:
determining the performance of orchestration tasks, with each orchestration task designed to change the corresponding set of nodes hosting corresponding data services; and
updating said node-map data to reflect the changed set of nodes hosting each data service after performance of the corresponding orchestration task such that said consumer system is provided identifiers of the changed set of nodes currently hosting said first data service.

20. The non-transitory machine readable medium system of claim 19, wherein the corresponding set of nodes currently hosting a second data service of said plurality of data services spans said cloud infrastructure and a second cloud infrastructure,
wherein said node map data indicates at a second time instance that the second data service is currently hosted on a second set of nodes spanning said cloud infrastructure and a second cloud infrastructure;
the actions further comprising:
receiving, from the consumer system a second resolution request containing an identifier of said second data service; and
sending, as a response to said resolution request, identifiers of said second set of nodes currently hosting said second data service as indicated by said node-map data.

21. The non-transitory machine readable medium system of claim 14, wherein each node is identified by a corresponding IP (Internet Protocol) address in said node-map data,
further comprising one or more instructions for propagating said node-map data to an external DNS (Domain Name System) server such that said consumer system can thereafter access the IP addresses of nodes providing each data service.

22. The non-transitory machine readable medium of claim 21, wherein said node-map data is also maintained according to DNS in said name server, wherein each data service of said plurality of data services is a distributed database.

23. A method of consuming data services provisioned in cloud infrastructures, the method being performed in a consumer system, the method comprising:
sending, to a name server, a first resolution request at a first time instance and then a second resolution request at a second time instance,
wherein both of said first resolution request and said second resolution request contains an identifier of a first data service sought to be accessed,
wherein said first data service is hosted on a corresponding set of nodes forming a universe in a cloud infrastructure,
wherein the corresponding set of nodes change upon performance of orchestration tasks, said orchestration tasks comprise at least one of expanding the universe, shrinking the universe, and migration of the universe,
wherein expanding of the universe causes addition of at least one node to the corresponding set of nodes,
wherein shrinking of the universe causes removal of at least one node from the corresponding set of nodes,
wherein migration of the universe causes replacement of at least one node of the corresponding set of nodes with another node,
receiving from said name server, a resolution response specifying identifiers of said a first set of nodes for said first resolution request and a different set of nodes for said second resolution request as being contained in said universe at said first time instance and said second time instance respectively, said different set of nodes not being identical to said first set of nodes in view of at least one orchestration task being performed between said first time instance and said second time instance; and accessing said first data service through at least one of said first set of nodes after said first time instance and through at least one of said different set of nodes after said second time instance using the corresponding identifier received from said name server.

24. The method of claim 23, wherein the corresponding set of nodes currently hosting said first data service spans a first cloud infrastructure and a second cloud infrastructure, wherein said first set of nodes includes a first node from said first cloud infrastructure and a second node from said second cloud infrastructure.

25. The method of claim 23, wherein the corresponding set of nodes currently hosting said first data service comprises a first plurality of nodes, wherein said first resolution request includes a qualifier along with said identifier, wherein said first set of nodes includes only those of said first plurality of nodes matching said qualifier.

26. The method of claim 25, wherein said first plurality of nodes are organized into a plurality of groups, each group being identified by a corresponding group identifier, wherein said consumer system specifies a desired group identifier as said qualifier and receives nodes of a group identified by said desired group identifier as said first set of nodes.

27. The method of claim 26, wherein said plurality of groups includes a primary cluster comprising a primary set of nodes for said first data service, and a read-replica cluster comprising a secondary set of nodes for said first data service, wherein said qualifier specifies one of said primary cluster and said read replica cluster.

28. The method of claim 27, wherein said consumer system specifies said primary cluster as said qualifier and receives identifiers of said primary set of nodes as said first set of nodes, wherein said accessing comprises a write operation on one of said primary set of nodes.

29. The method of claim 27, wherein said consumer system specifies said read replica cluster as said qualifier and receives identifiers of said secondary set of nodes as said first set of nodes, wherein said accessing comprises a read operation on one of said secondary set of nodes.

30. The method of claim 26, wherein said plurality of groups represents a plurality of regions, wherein said consumer system specifies the identifier of a region in which said consumer system is present as said qualifier and receives nodes of said region as said first set of nodes, whereby said accessing of said first data service is facilitated to be performed with low latency.

31. The method of claim 26, wherein said plurality of groups are formed according to one of availability zones and cloud infrastructures, wherein each data service of said plurality of data services is a distributed database.

* * * * *